United States Patent
Shockley

(10) Patent No.: US 7,061,371 B2
(45) Date of Patent: Jun. 13, 2006

(54) AUTO MONITOR

(76) Inventor: Stephen W. Shockley, Rd. #2, Box 136 D, Frankford, DE (US) 19945

( * ) Notice: Subject to any disclaimer, the term of this patent is extended or adjusted under 35 U.S.C. 154(b) by 296 days.

(21) Appl. No.: 10/370,756

(22) Filed: Feb. 24, 2003

(65) Prior Publication Data

US 2003/0187557 A1    Oct. 2, 2003

Related U.S. Application Data

(60) Provisional application No. 60/367,498, filed on Mar. 27, 2002.

(51) Int. Cl.
*H04B 3/36* (2006.01)
(52) U.S. Cl. .................. 340/425.1; 340/459; 701/35
(58) Field of Classification Search ............ 340/425.5, 340/438–442, 450–454, 459–462, 425.1; 701/29–35
See application file for complete search history.

(56) References Cited

U.S. PATENT DOCUMENTS

| | | | |
|---|---|---|---|
| 4,038,634 A * | 7/1977 | Caliri | 340/459 |
| 4,908,868 A | 3/1990 | McTaggart | 381/59 |
| 5,617,072 A * | 4/1997 | McNeal | 340/431 |
| 5,677,667 A * | 10/1997 | Lesesky et al. | 340/431 |
| 5,683,103 A * | 11/1997 | Blackburn et al. | 280/735 |
| 5,725,189 A | 3/1998 | Landy | 248/205.2 |

FOREIGN PATENT DOCUMENTS

| | | |
|---|---|---|
| EP | 0926657 | 6/1999 |
| GB | 2 218 584 A | 11/1969 |
| JP | 62805 | 10/1994 |

* cited by examiner

*Primary Examiner*—Jeffery Hofsass
*Assistant Examiner*—Jennifer A. Mehmood
(74) *Attorney, Agent, or Firm*—Richard C. Litman

(57) ABSTRACT

An automobile diagnostic system monitors in real-time sub-system components. The system has a plurality of acoustic and video sensors in combination for audibly detecting and visually monitoring critical noise levels and/or vibrations in sub-systems such as brakes, shocks, universal joints, exhaust and transmission systems, etc. Each combination sensor is attached a particular sub-system component for monitoring. The data is recorded on a (VCR) system for visual identification and the recording transmitted to a television and Video Cassette. A control panel has a series of Light Emitting Diodes (LEDs) and audible alarms as respective visual and audible alert indicators of tuned frequencies for a particular sub-system component.

14 Claims, 4 Drawing Sheets

AUTO MONITOR

CROSS-REFERENCE TO RELATED APPLICATION

This application claims the benefit of U.S. Provisional Patent Application Ser. No. 60/367,498, filed Mar. 27, 2002.

BACKGROUND OF THE INVENTION

1. Field of the Invention

The present invention relates generally to diagnostic systems. More specifically, the invention is an automobile diagnostic system for monitoring in real-time various sub-system components such as brakes, shocks, universal joints, exhaust and transmission systems.

2. Description of Related Art

Various automobile diagnostic systems have been devised for analyzing real-time performance of automobile sub-systems. However, the practice of audio technology within vehicles as a diagnostic tool has been limited to the utilization of audio sensors for ascertaining characteristic failure and other noises of various sub-system component parts. For example, conventional audio sensors have been used exclusively to detect muffler noises. One of the set backs of this particular diagnostic method is a visual inspection is almost always required as a matter of routine before any physical damage or a reasonable course of repair can be determined for a respective subsystem. Unlike conventional diagnostic tools as described hereinbelow, the automobile monitoring system according to the invention solves the problem noted above by utilizing a combination video and audio detector system for monitoring real-time images and noises associated with numerous sub-system components within a vehicle. This type of apparatus and analysis is lacking in conventional diagnostic tools described below.

For example, U.S. Pat. No. 4,671,371 issued to Shimizu discloses a motor-driven power steering system which includes a linkage mechanism having tie rods coupled to the steerable wheels and an arm coupled to the tire rods and interconnecting the steering wheel and steerable wheels to each other. A torque detector is disposed within the linkage mechanism for detecting the torque applied to the steering wheel and generating a signal indicative of the detected torque. Noise and vibration are prevented from being transmitted to the passenger compartment and the steering wheel.

U.S. Pat. No. 4,707,687 issued to Thomas et al. discloses a tool diagnostic circuit comprising a detector which discriminates between tool break acoustic signatures and spiky noises. A common tool break vibration signature is indicated by a sudden appearance of a dense spiky noise. Digital signal pattern recognition logic is used to reject noise based on its lower spike density via an up/down counter. An alarm sounds upon the occurrence of a tool break signature. Preprocessed vibration signal samples are tested against a detection threshold and an alarm generated if the respective signals exceed a preset threshold by a preset count.

U.S. Pat. No. 4,908,868 issued to McTaggart discloses a phase polarity test instrument, which determines the relative phase polarities between two acoustic or electric signals. A built-in dual channel amplifier enables a pair of microphones to be used as probes to determine phase polarities between two speakers. An OR-function selects the stronger of the two signals under test for comparison. A pair of LED indicators, "IN-PHASE (green), and "OUT-OF-PHASE (red), are driven from a dual-comparator discriminator circuit.

U.S. Pat. No. 5,677,604 issued to Masaki et al. discloses a control system for an electric automobile. The control system provides selective current control for achieving high driving performance states of the electric vehicle. When in a drive mode, the system controls the current of an inverter and detects current, which drives an induction motor. In a charge mode, the system detects the current of the accumulated charge using the detector. The detector detects current for the two modes, although the current detection range varies or differs by several times between driving and charging modes. That is, the system detects higher current when driving, and lower current when charging as a diagnostic current detection system.

U.S. Pat. No. 5,725,189 issued to Landy discloses a media mounting apparatus for mounting a television set and/or a VCR within motor vehicles. The support apparatus includes two mating wedge-shaped elements attached via hook and loop fasteners, which provide support for a TV or VCR in combination. The support apparatus includes a strap support configured with hook and loop fasteners for securing the respective devices securely mounted to the wedge support within a vehicle.

The British Patent No. GB 2 218 584 A granted to Heading et al. discloses an automobile monitoring system comprising an operational amplifier having a fixed alternating voltage of fixed frequency applied to a first input with dual feedback via a capacitance resistance circuit. A noise rejection circuit is connected to a second input, which also connects with a switch-controlled lamp cluster so that the second input voltage is dependent on the resistance of the lamp cluster. A voltage comparator is also used to control an indicator lamp and an active filter followed by a peak signal detector for lamp monitoring.

The Japanese Patent granted to Kenichi discloses a diagnostic tool for an automobile, which includes the utilization of a microphone for diagnosing an engine part or muffler condition. Engine noise from the microphone is sounded from an acoustic device in the automobile for diagnosing the condition of an engine. The microphone is installed on the muffler part of the automobile, and exhaust noise from the microphone is sounded by the acoustic device disposed within the automobile for audible appreciation of exhaust noise to ascertain failure characteristics from the muffler.

The European Patent No. EP 0 926 657 A1 granted to Christian et al. discloses an acoustic detection system which produces a reference signal for eliminating detected acoustic signals. The system includes the use of a vibration sensor, which is placed directly next to at least one source of parasitic noise. A signal is derived from this and used as a reference signal. A further signal is derived from an aerial measurement of acoustic pressure signals, which is correlated with the reference signal for subsequent process, and identification of an unknown external acoustic source.

The German Patent No. DE 199 00 782 A1 granted to Ruediger discloses a noise reduction device for automobiles comprising an active capacitive sound source disposed at one or both sides of a wheel housing. The device incorporates a noise detector coupled to an electronic control device, which supplies a signal to the sound source via an intermediate amplifier.

None of the above inventions and patents, taken either singly or in combination, is seen to describe the instant invention as claimed.

SUMMARY OF THE INVENTION

The automobile monitor according to the invention monitors in real-time various sub-system components within an automobile. The system includes the utilization of a plurality of acoustic and video sensors in combination for audibly detecting and visually monitoring critical noise levels and/or vibrations in sub-systems such as brakes, shocks, universal joints, exhaust and transmission systems, etc. Each combination sensor is adapted with sub-system attachment elements such as magnets, C-clamps or the like for fixedly attaching a respective combination sensor to a particular sub-system component for monitoring.

The audio and image data are transmitted to a television and Video Cassette Recorder (VCR) system for visual identification and recording of the detected data. A control panel is also used and is configured with a series of Light Emitting Diodes (LEDs) and audible alarms as respective visual and audible alert indicators, which are tuned to frequencies characteristic of a particular sub-system component. The system is configured as a portable or stand alone system with an on-board direct current (DC) power source or as a fixed monitoring system installed within the dashboard of a vehicle with auxiliary power connections made with respect to the vehicle's battery or power source.

Accordingly, it is a principal object of the invention to provide an automobile monitoring system, which provides real-time monitoring of sub-system components of an automobile.

It is another object of the invention to provide an automobile monitoring system, which provides video images of a sub-system to visually detect an apparent condition.

It is a further object of the invention is to provide an automobile monitoring system, which provides audio signals of a sub-system to audibly detect an apparent condition.

Still another object of the invention is to provide an automobile monitoring system, which can selectively record and synthesize video and audio signals for a plurality of sub-system components of an automobile.

Further still, it is another object of the invention to provide an automobile monitoring system which can selectively monitor video and audio signals for a single sub-system component of an automobile on a select channel.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is directed to an automobile diagnostic system for monitoring in real-time a number of different subsystem components of a high or low performance vehicle. The preferred embodiments of the present invention are depicted in FIGS. 1–3, and are generally referenced by numerals 4 and 5, respectively.

Figure 1:
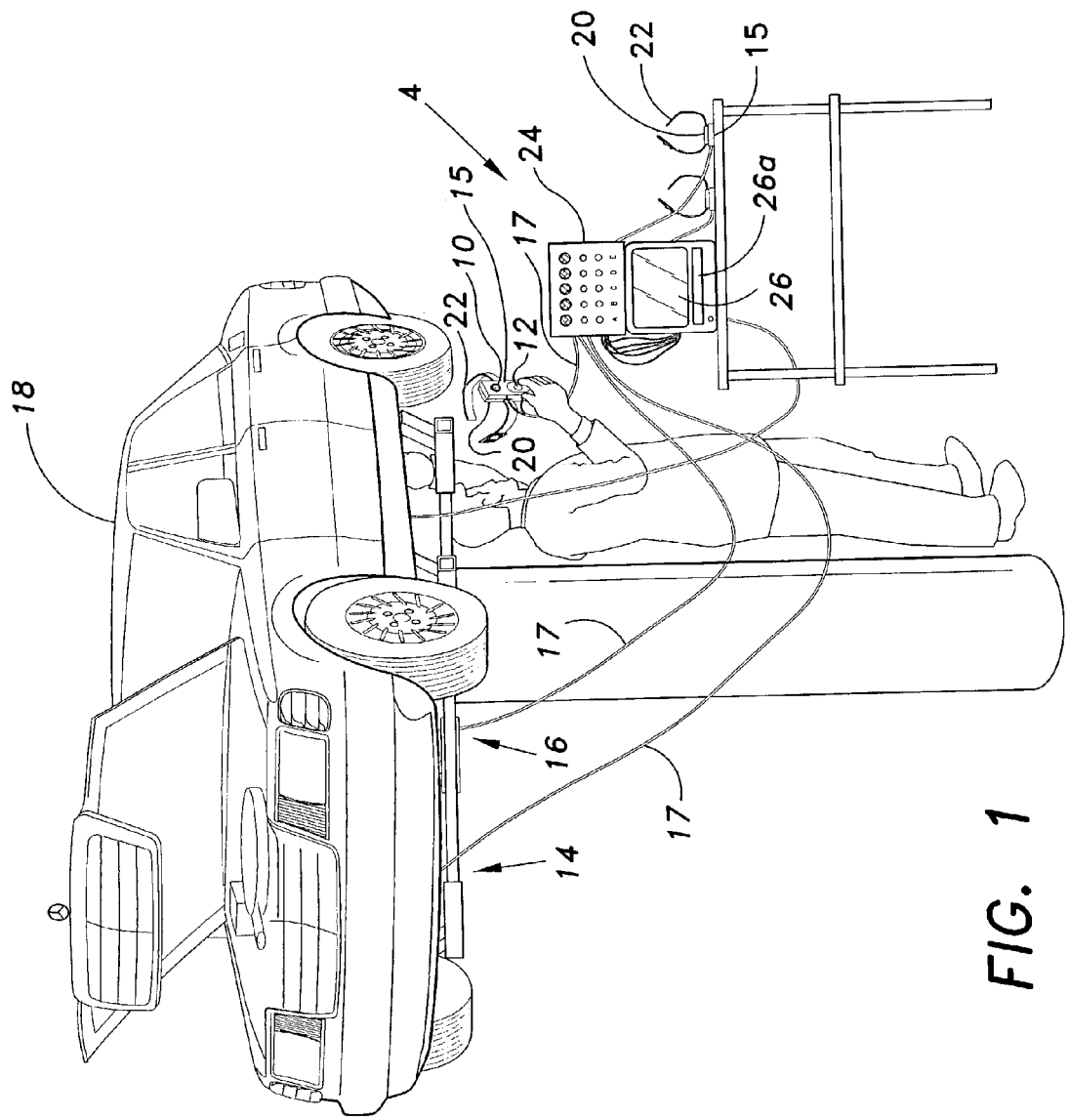
FIG. 1 is an environmental, perspective view of an automobile monitor according to the present invention.

As best seen in FIG. 1, the automobile diagnostic system according to the first embodiment 4 comprises at least one first audio sensor 10 and a second video sensor 12 for detecting at least one respective first audio signal 10a and second video signal 12a from at least one subsystem component 14,16 (e.g. brakes, shocks, universal joints, exhaust and transmission systems, etc.) of a vehicle 18. As shown therein, the audio and video sensors 10 and 14 are configured as a combination or single integrated sensor module 15 adapted with a magnetic backing 20 and a C-clamp mechanical fastener 22 for fixedly securing the sensor module 15 to a subsystem component 14,16.

Accordingly, detected audio and video signals 10a and 12b from a subsystem component 14,16 are electrically transmitted through a control panel 24 and to a combination television receiver, monitor, and Video Cassette (26a) Recorder (VCR) 26 via twisted pair cable 17. The twisted pair cable 17 serves to reduce transmitted signal noise with respect to adjacent cables also transmitting signals. The first embodiment 4 is depicted and configured as a portable or stand-alone system 4. As a portable system, data transmission to the VCR 26 via selective cables 17A, 17B, 17C, 17D and 17E are preferably made as recessed data cable transmissions. That is, the data transmission cables have been exposed for illustrative purposes only and are not exposed as a working model, but are disposed rather as hidden data transmission lines 17A, 17B, 17C, 17D and 17E within the housing of the combination TV/VCR unit 26. Also, all external power connections for the TV/VCR unit 26 are made either directly to the battery of the automobile or vehicle 18 (or to the cigarette lighter as an optional portable feature) via power line 26b of the TV/VCR unit 26.

Figure 2A:
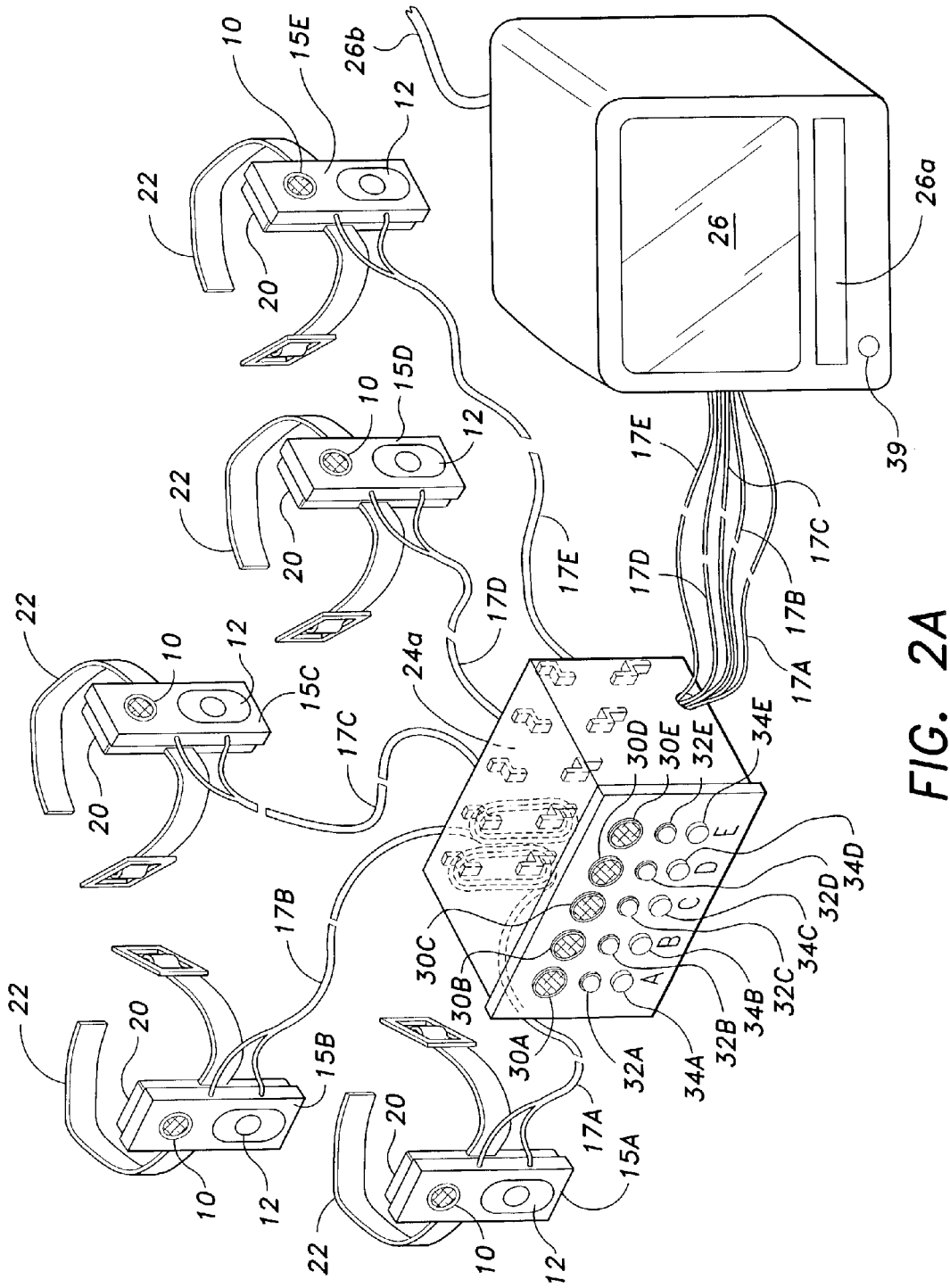
FIG. 2A is an exploded perspective view of the automobile monitor according to a first embodiment.
Figure 3:
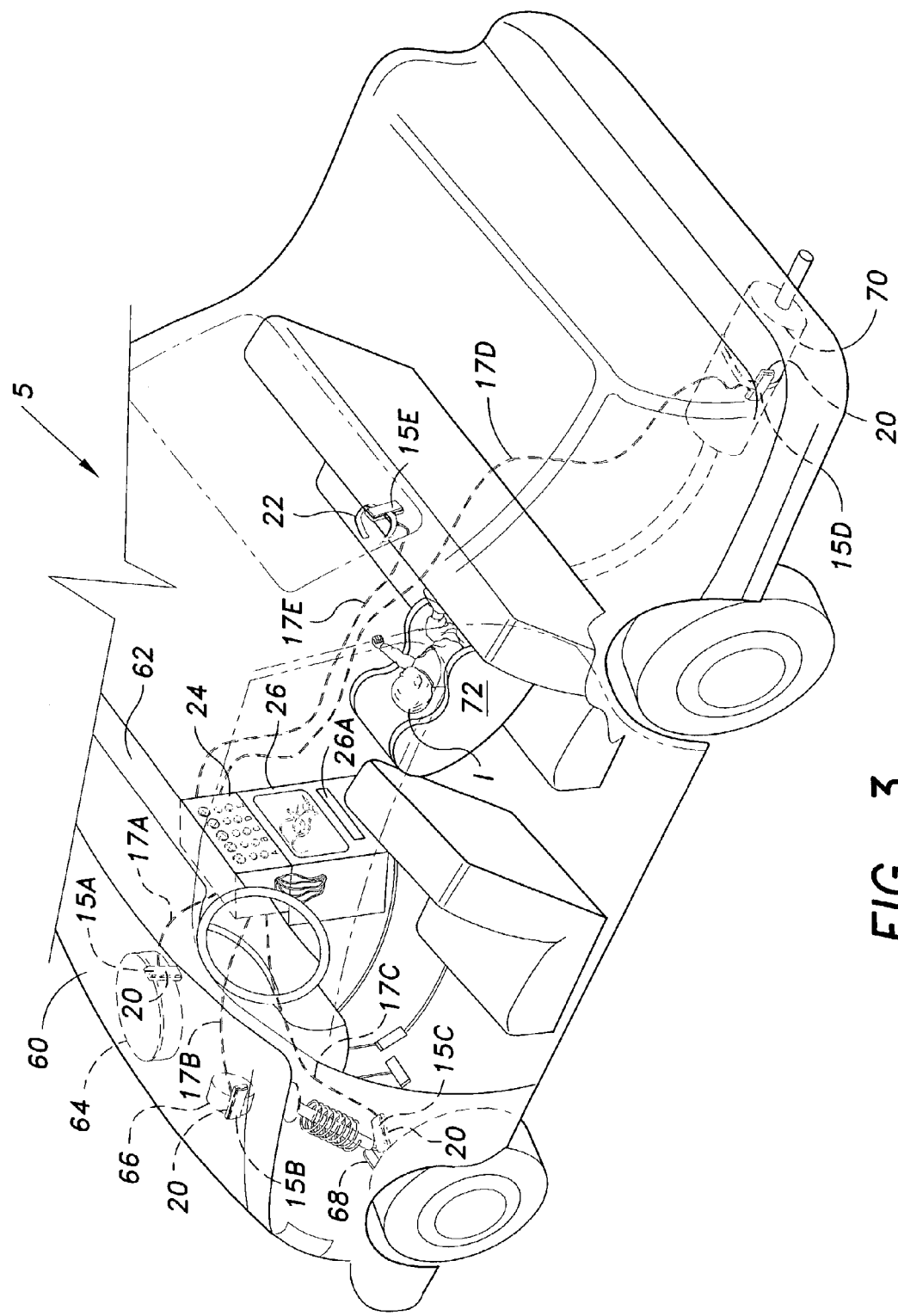
FIG. 3 is a perspective view of the automobile monitor according to a second embodiment, illustrating the automobile monitor as a fixed monitoring system disposed within a dashboard of an automobile.

As diagrammatically illustrated in FIG. 2A, the portable automobile diagnostic system 4 is shown in an exploded perspective to illustrate a plurality of combination sensors 15A, 15B, 15C, 15D, 15E electrically adapted through the control panel 24 (shown as a black box) and to the combination TV/VCR 26 on select channels A, B, C, D and E via transmission lines 17A, 17B, 17C, 17D and 17E as combination audio/video inputs. As shown therein, the control panel 24 comprises a series of indicators to indicate an audible signal via speakers or amplifiers 30A, 30B, 30C, 30D and 30E, LED indicators 32A, 32B, 32C, 32D and 32E to indicate a respective visual alarm for a selective subsystem component 14,16. An additional feature of the control panel includes selective record button features 34A, 34B, 34C, 34D and 34E which activate the recording feature of the TV/VCR 26 on respective channels A, B, C, D and E. Each channel can be calibrated or tuned to a specific channel frequency for selective viewing and recording as a matter of personal preference. Remote control activation of the recording features of the unit 4 can also be performed via a conventional remote control programmable unit (not shown) via an infrared sensor means 39 disposed within a base portion of the TV/VCR unit 26.

Other optional features include the utilization of top and bottom brackets 40 and 42 formed on a rear wall portion 24a of the control panel 24 to secure any unused combination sensors 15A–15E thereto. The intricate circuit features have been omitted in this figure and illustrated in black box form sufficient to minimize unnecessary clutter in the illustration. Such features are considered to be well known to one having ordinary skill in the relevant art, and therefore easily performed. More detailed circuit illustrations have been preserved and shown in FIG. 2B.

Figure 2B:
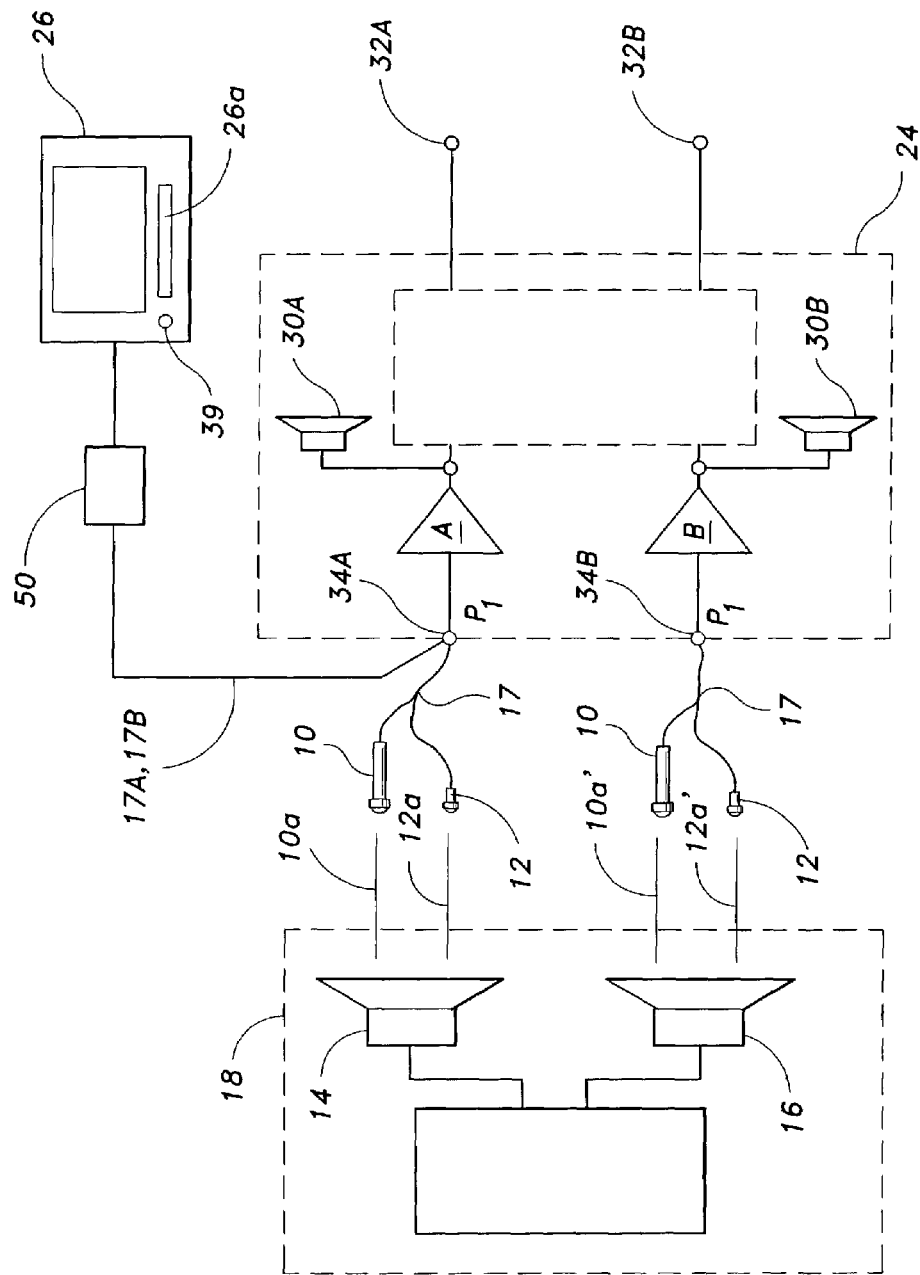
FIG. 2B is an exemplary circuit diagram of the automobile monitor according to the invention.

As depicted in FIG. 2B, an exemplary control circuit diagram is shown to illustrate operative component features of the invention. As shown herein, subsystem features 14,16 are indicated as sources of parasitic noise and are shown enclosed within a vehicle block 18. Any number of subsystem components (e.g. brakes, shocks, universal joints, exhaust and transmission systems, etc.) can be considered as sources of parasitic noise and therefore are not limited to exemplary subsystem features 14,16 as depicted.

Notwithstanding, subsystem component 14 is shown tuned to channel A having signals 10a and 12a detected by respective audio and video sensors 10 and 12. The obtained signals are transmitted over twisted pair cable 17 and channeled to the TV/VCR as parallel data input or optional serial input via a multiplexer 50. Node $P_1$ is linked to and electrically connected to the record button 34A for recording video and audio signals 10a,12a for subsystem 14 on video cassette 26a. Audible and visual indicator components 30A and 32A supply audible and visual alarms via speakers and color elected LEDs for subsystem component 14.

Similarly, subsystem component 16 is shown tuned to channel B having signals 10a' and 12a' detected by respective audio and video sensors 10 and 12. The obtained signals are transmitted over twisted pair cable 17 and channeled to the TV/VCR as parallel data input or optional serial input via a multiplexer 50. Node $P_2$ is linked to and electrically connected to the record button 34B for recording video and audio signals 10a',12a' for subsystem 16 on video cassette 26a. Audible and visual indicator components 30B and 32B supply audible and visual alarms via speakers and color elected LEDs for subsystem component 16.

Without limit to the number of channels A, B, C, D and E, the control circuit of the control panel 24 demonstrates wherein at least one first and second input signal 10a,12a representative of at least one characteristic of a subsystem component 14 from an automobile is detected and selectively recorded through a single channel namely A. As enumerated, it is preferred that at least one first signal 10a be characteristically distinct and different from at least one second signal 12a as such signal are by nature differently detected signals. The first signal being simply an audible signal and the second being a video image signal. The noise between a series of signals is reduced by twisted pair cable 17. Accordingly, an improved recording of the selective component is made a stored on video cassette 26a for subsequent viewing with a patron or master mechanic.

As diagrammatically illustrated in FIG. 3, the automobile diagnostic system 5 according to the second embodiment is shown wherein a vehicle 60 is configured with the system 5 mounted within a central portion of dashboard 62 as a fixed system 5. As shown therein, a plurality of subsystems engine component 64, engine component or alternator 66, left shock or strut 68, muffler 70 and an interior cab monitor of an infant I mounted infant car seat 72 are configured with respective sensor modules 15A, 15B, 15C, 15D and 15E monitoring on respective channels A, B, C, D, and E. As a fixed arrangement multiple subsystem can be monitored on long distance trips and over time which provide real-time footage and assessment of critical components before failure.

An added feature of the invention include wherein practical needs are met such as the need to monitor the activity of newborn or infant to prevent Sudden Infant Death Syndrome (SIDS). In addition, the system in either embodiment 4,5 can accommodate any number of a user's favorite videos as a reprieve from what may seem to be the monotonous sounds and images of a mechanic's "world of vehicle music". Audible ranges have not been indicated, since such ranges depend upon the intended measurement desired by one having ordinary skill in the audible detection art. With respect to specific image resolutions, the same reason applies as to the intended resolution of the image and its criticality to necessity of particular clarity. Simple miniature digital web cams or similarly configured miniature digital cameras can be used at a selective resolution depended upon the intended use by one having ordinary skill in the camera or video image art. Thus, such characteristic data is considered to be well within the knowledge of one having ordinary skill to perform.

It is to be understood that the present invention is not limited to the sole embodiments described above, but encompasses any and all embodiments within the scope of the following claims.

I claim:

1. An automobile monitoring system, comprising:
   a plurality of sensor modules selectively disposed adjacent an automobile subsystem, each one of said plurality of sensor modules detecting characteristics of the automobile subsystem, and generating respective audio and video signals representative of the detected characteristics;
   a plurality of control circuits respectively connected to said plurality of sensor modules;
   means for attaching each sensor module to a respective automobile subsystem to be monitored;
   each said audio signal being characteristically distinct and different from each said video signal;
   means for selectively generating an output signal of said at least one of said audio and said video signals electrically coupled to each said control circuits; and
   means for storing said output signals of said at least one subsystem component from the automobile; and
   means for indicating a characteristic condition of said output signals;
   wherein each one of said plurality of control circuits transmitting corresponding pairs of said first and second signals to said means for selectively generating, and said means for indicating a characteristic condition of a said sub-system and said means for storing data indicating and storing the generated output signals;
   whereby a diagnostic evaluation of the automobile subsystem is determined from the indicating and storing means.

2. The system according to claim 1, wherein said means for indicating includes a video receiver and monitor.

3. The system according to claim 2, wherein said means for indicating and said means for storing are a combination television receiver, monitor, and video recorder.

4. The system according to claim 3, further comprising a multiplexer connected within said combination television receiver, monitor, and video recorder for providing serial signal inputs thereto.

5. The system according to claim 1, wherein said control circuit for controlling said audio and video signals representative of at least one characteristic of said component automobile subsystem and said means for selectively generating an output signal of said at least one first and second input signals is a control panel having a control switch for selecting a desired pair of said audio and video signals.

6. The system according to claim 5, wherein said means for indicating is an audio alert amplifier having a tuned frequency corresponding to a particular subsystem component for alerting the operator of a signal indicating defective operation of said component.

7. The system according to claim 6, wherein said means for indicating is an alert LED having a tuned frequency corresponding to a particular subsystem component for alerting the operator of a signal indicating defective operation of the component.

8. The system according to claim 7, wherein said means for indicating and said means are a combination television receiver, monitor, and video recorder.

9. The system according to claim 8, further comprising means for reducing signal noise between said at least one pair of said audio and video signals and another pair of audio and video signals, said means for reducing signal noise including twisted cables pairs for carrying each pair of audio and video signals between said corresponding sensor modules, said control panel and said television receiver.

10. The system according to claim 1, wherein said means for attaching includes a magnetic portion for magnetically attaching each said sensor module to the respective subsystem component.

11. The system according to claim 1, wherein said means for attaching includes a mechanical fastener for attaching each said sensor module to the respective subsystem component.

12. The system according to claim 11, wherein said mechanical fastener is a C-clamp.

13. The system of claim 1, wherein said plurality of sensor modules are mounted at a respective plurality of subsystem components including brakes, shock absorbers, universal joints, exhaust, and transmission systems.

14. The system of claim 11, wherein said means for indicating and said means for storing are removably mounted within the automobile being monitored.

* * * * *